US007570208B2

(12) United States Patent
Wang et al.

(10) Patent No.: US 7,570,208 B2
(45) Date of Patent: Aug. 4, 2009

(54) UNASSISTED INDOOR GPS RECEIVER

(75) Inventors: Chi-Shin Wang, Half Moon Bay, CA (US); Zongde Qiu, Shishi (CN); Shridhara A. Kudrethaya, Cupertino, CA (US); Jun Mo, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 5 days.

(21) Appl. No.: 11/324,144

(22) Filed: Dec. 29, 2005

(65) Prior Publication Data
US 2007/0152878 A1 Jul. 5, 2007

(51) Int. Cl.
G01S 5/14 (2006.01)
H04B 1/16 (2006.01)

(52) U.S. Cl. .................. 342/357.15; 455/343.2

(58) Field of Classification Search ............ 342/357.12, 342/357.15; 455/343.2
See application file for complete search history.

(56) References Cited

U.S. PATENT DOCUMENTS

| | | | |
|---|---|---|---|
| 4,601,005 A | 7/1986 | Kilvington | |
| 5,430,657 A * | 7/1995 | Kyrtsos | .................. 701/226 |
| 5,587,716 A | 12/1996 | Sheynblat | |
| 5,731,787 A | 3/1998 | Sheynblat | |
| 5,768,319 A | 6/1998 | Durboraw | |
| 5,896,304 A * | 4/1999 | Tiemann et al. | ................. 708/5 |
| 6,211,819 B1 * | 4/2001 | King et al. | ............ 342/357.09 |
| 6,295,023 B1 | 9/2001 | Bloebaum | |
| 6,424,890 B1 | 7/2002 | Syrjarinne | |
| 6,437,735 B1 * | 8/2002 | McMahan | ................ 342/357.1 |
| 6,611,756 B1 | 8/2003 | Chen et al. | |
| 6,683,564 B1 | 1/2004 | Mcburney | |
| 6,725,157 B1 * | 4/2004 | Yu | ............................. 701/213 |
| 6,757,610 B1 | 6/2004 | Mann | |
| 6,829,535 B2 * | 12/2004 | van Diggelen et al. | ...... 701/213 |
| 6,888,879 B1 * | 5/2005 | Lennen | ........................ 375/149 |
| 7,102,565 B2 * | 9/2006 | Jesson | .................... 342/357.12 |
| 7,142,157 B2 * | 11/2006 | Garin et al. | ............. 342/357.15 |
| 7,176,833 B2 * | 2/2007 | Jendbro et al. | ......... 342/357.06 |
| 7,196,661 B2 * | 3/2007 | Harvey | .................. 342/357.15 |
| 2004/0263386 A1 * | 12/2004 | King et al. | ............. 342/357.06 |
| 2007/0019714 A1 * | 1/2007 | Bochkovskiy et al. | ...... 375/150 |
| 2007/0120734 A1 * | 5/2007 | Salkhi | .................... 342/357.06 |

OTHER PUBLICATIONS

Van Diggelen, Dr. Frank, "Global Locate and Indoor GPS Chipset & Services," Presented at ION-GPS 2001, Salt Lake City, pp. 1-7.*
Van Diggelen, Dr. Frank et al, "Indoor GPS Technology," Presented at CTIA Wireless Agenda, Dallas, May 2001, pp. 1-10.*
Vittorini, Larry et al, "Receiver Frequency Standards: Optimizing Indoor GPS Performance," GPS World Nov. 2003, pp. 40-48.*

* cited by examiner

Primary Examiner—Gregory C Issing
(74) Attorney, Agent, or Firm—The Eclipse Group LLP

(57) ABSTRACT

The present invention provides GPS receivers capable of tracking very weak GPS signals particularly in an indoor environment without assistance from an external server or a network. In a preferred embodiment, a GPS receiver initially acquires and locks onto GPS satellite signals to compute receiver position outdoors. The GPS receiver then tracks at least one satellite signal indoors to maintain acquisition parameters for quick acquisition of GPS signals. To save power, the receiver automatically goes to the sleep state and periodically wakes up, i.e., powers up, to maintain the at least one satellite signal tracking. During the wakeup state, the receiver collects ephemeris data from the at least one satellite signal when the ephemeris data needs to be updated for quick acquisition of GPS signals.

48 Claims, 3 Drawing Sheets

UNASSISTED INDOOR GPS RECEIVER

FIELD OF THE INVENTION

The present invention relates to satellite based navigational receivers, and more particularly to efficient tracking and reacquisition of navigational signals under weak signal conditions and/or indoor operations.

BACKGROUND

The global positioning system (GPS) is a satellite based radio-navigation system built and operated by the United States Department of Defense. The Russian government operated 'GLONASS' and European Union proposed 'Galileo' are two other important satellite based navigational systems.

GPS permits a user of the system to determine his or her position on the surface of the earth. The system consists of twenty-four satellites circling the earth at an altitude of about 11,000 miles with a period of about 12 hours. It is possible to have more than twenty-four satellites due to the presence of some spare satellites in the GPS constellation. These satellites are placed in six different orbits such that at any time a minimum of six and a maximum of more than eleven satellites are visible to any user on the surface of the earth except in the polar region. Each satellite transmits an accurate time and position signal referenced to an atomic clock. A typical GPS receiver locks onto this signal and extracts the data contained in it and with signals from a sufficient number of satellites, a GPS receiver can calculate its position, velocity, altitude, and time.

Sometimes GPS receivers are required to operate under very weak signal conditions as in foliage or indoors. In the present day practice, the receiver may get "assistance" in the form of additional acquisition aiding messages from a server or base station, or Internet based. But providing this type of assistance requires additional infrastructure and may not be available in all places. Also, the receiver requires additional hardware to receive the aiding messages. Therefore there is a need to develop GPS receivers that operate in "standalone" mode under weak or indoor signal conditions. Further, there is a need as in the case of E911 (Enhanced 911), for fast acquisition of the GPS signals. In addition to the above, the power saving in the receiver is also an important requirement.

Most of the standalone high sensitivity GPS receivers are based on a long non-coherent integration involving squaring loss and thus reducing the possible gain while taking a long time to acquire the satellite signal under weak signal conditions. U.S. Pat. No. 6,725,157 discloses a procedure wherein a GPS receiver first acquires the satellite signals and starts computing the position outdoor and then if possible maintains this lock when moved indoor. U.S. Pat. No. 6,757,610 discloses a method of storing some tracking/reacquisition aiding parameters such as clock Doppler and receiver velocity. However, these parameters help only in reducing the search frequency band. U.S. Pat. No. 6,683,564 discloses a technique of pattern matching using the known content of the navigation data word HOW, but this method involves getting the HOW from a local server. U.S. Pat. No. 5,768,319 discusses a method of multiple frame overlay to improve sensitivity. This overlay is done at the final stage and not with the I and Q components. U.S. Pat. No. 6,611,756 predicts the navigation data for long time integration. The predicted data includes mainly the time of week, week number, etc. The predicted data is used to wipe off the data modulation. U.S. Pat. No. 6,295,023 discloses a timing assistance scheme to improve sensitivity. The assistance may be from a network or from many satellites, but not by at least one satellite as will be shown in the invention and the implementation method is different from the scheme that will be presented in the invention. U.S. Pat. No. 6,424,890 claims a method of interpolation for satellite orbit determination at various time stamps. But there are no polynomial based ephemeris extrapolation methods disclosed. U.S. Pat. Nos. 5,731,787 and 5,587,716 disclose using polynomials to predict data only during DGPS blank-out period. U.S. Pat. No. 5,430,657 discloses a method of predicting the position of satellites using a plurality of receivers. This does not involve predicting the ephemeris but only used for testing whether ephemeris are corrupted or not. Further, published U.S. Patent Application 2005/0035904 discloses an ephemeris prediction based on tables. Finally, U.S. Pat. No. 4,601,005 discloses single satellite tracking using an FFT technique.

Thus, the prior art shows that there are no techniques available for the tracking and reacquisition of GPS signals in standalone mode especially in indoor environments and a method is required to reduce the cost and network interfacing problems. In addition, present day GPS receiver design techniques do not address the high dynamic environment under weak signal conditions in indoor environments.

Therefore, there is a need for a standalone GPS receiver capable of tracking and reacquiring GPS signals under weak signal conditions especially in indoor environments. Such a standalone GPS would also alleviate the cost and network interfacing problems by not requiring assistance from an external server or a network. There is also a need for a standalone GPS receiver having an efficient power saving mode while being capable of downloading the ephemeris and almanac whenever required. Further, there is a need for a standalone GPS receiver capable of operating in a high dynamic environment under weak signal conditions.

Fast reacquisition of GPS signals is needed in many applications. Thus, there is a need for updating the ephemeris data in a receiver, which helps in accurate estimation of the distance from receiver to satellite for Doppler estimation, predicting data for pattern matching, ect. There is also a need for long coherent integration instead of time consuming non-coherent integration. Continuous tracking of satellite when visible satellites list changes is also important. When no direct satellite signals are available, there is a need for position computation means based on less accurate multi-path signals. Further, there is a need to make use of outdated ephemeris rather than almanacs for better accuracy.

SUMMARY OF THE INVENTION

The present invention provides GPS receivers capable of tracking very weak GPS signals particularly in an indoor environment without assistance from an external server or a network.

In a preferred embodiment, a standalone GPS receiver is provided which saves power by switching between sleep and wakeup states, quickly reacquires satellite signals by tracking at least one satellite all the time to derive GPS clock, and which makes use of indoor environment to predict the clock and code drift during the power off period. In this embodiment, the GPS receiver initially acquires and locks onto GPS satellite signals to compute receiver position outdoors. The GPS receiver then tracks at least one satellite signal indoors to maintain acquisition parameters for quick acquisition of GPS signals. To save power, the receiver automatically goes to the sleep state and periodically wakes up, i.e., powers up, to maintain the at least one satellite signal tracking. During the wakeup state, the receiver tests the signal strength of the received signal. If the signal strength is strong enough it proceeds to collect the ephemeris data from the at least one satellite signal when the ephemeris data needs to be updated for quick acquisition of GPS signals. Further, the receiver uses the ephemeris data from the at least one satellite tracking to derive clock calibration parameters to maintain receiver clock synchronization with the GPS system clock which helps in quick acquisition of GPS signals.

In another embodiment, the receiver acquires weak GPS signals using long integration.

In another embodiment, the power is kept off for a much greater time than the power is on to achieve a large power savings.

In yet another embodiment, if the signal strength is not strong enough for ephemeris data collection, the receiver goes to the sleep state and tries again to reacquire the signal after a fixed amount of time.

In yet another embodiment, if ephemeris data is unavailable, the receiver predicts the ephemeris data using a polynomial extrapolation.

In yet another embodiment, the ephemeris data is extracted by overlaying sequential navigation data frames and/or majority voting of several navigation data frames.

In yet another embodiment, the receiver uses pattern matching of known patterns, such as Z-count, HOW, ect. to facilitate long coherent integration and correct overlay.

In yet another embodiment, the receiver changes the tracked satellite when the present satellite goes below the horizon.

In yet another embodiment, a Fast Fourier Transfer (FFT) technique is used to determine the carrier frequency when there are wide frequency swings due to high dynamics. This allows the receiver to also operate in a high dynamic signal reception environment.

In yet another embodiment, a sliding window technique is used to reduce the time of the FFT computation.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION OF THE INVENTION

Figure 1:
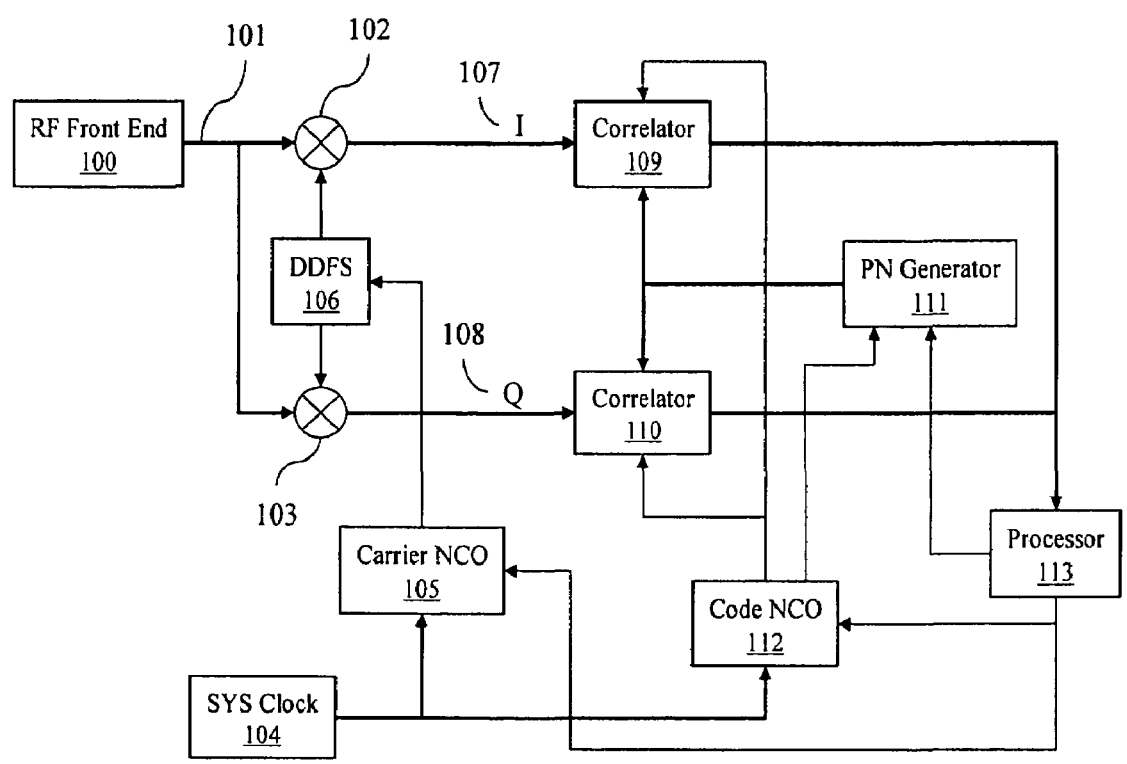
FIG. 1 is a functional block diagram of a GPS receiver according to an embodiment of the invention.

FIG. 1 is a functional block diagram of a GPS receiver according to an embodiment of the present invention. An RF front-end 100 processes the RF signal received at the antenna (not shown). Operations of a conversional RF front-end 100 include amplification, down-conversion, and analog-to-digital conversion. The RF front end 100 outputs an intermediate frequency (IF) signal 101 to a baseband section of the receiver from its analog-to-digital converter (ADC) output (not shown). The RF front-end 100 down converts the received RF into the intermediate frequency (IF) for baseband processing. The IF signal 101 is made available to two paths, one in-phase (I) and the other in-quadrature (Q). In the I path, the IF signal 101 is multiplied in IF mixer 102 in-phase with a local frequency signal generated by a direct digital frequency synthesizer (DDFS) 106 to produce the in-phase (I) component 107. In the Q path, the same signal 101 is multiplied by the DDFS frequency in-quadrature (i.e., with a phase shift of 90 degrees) to produce the quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of IF signal 101 As a result, the I and Q signals produced by the IF mixers 102 and 103 are near zero carrier frequency. In other words, the outputs I 107 and Q 108 of the IF mixers 102 and 103 are stripped or wiped off from the carrier (IF). The I and Q signals may be low-pass filtered to remove the high frequency components which are equal to twice the IF frequency band.

The I and Q components 107 and 108 are correlated in correlators 109 and 110, respectively, with a locally-generated pseudorandom (PN) sequence generated by a PN generator 111. The PN-sequence corresponds to the channel being processed by the baseband section at that time. The PN sequence generator is driven by code NCO 112. The local code generator frequency is made equal to the code rate of the I and Q paths by corrective feedback from the processor 113 to the code NCO 112. In addition, the processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at millisecond intervals in the form of 1 ms samples, where each 1 ms sample is the result of correlation of one PN sequence of length 1023 chips. The processor 113 may be implemented using a digital signal processor (DSP) core. Preferably, the processor is capable of performing fast math intensive operations. Subsequent processing of the signals takes place in the processor 113, as will be described in detail below. Additional details of the receiver baseband section can be found in U.S. patent application Ser. No. 11/123,861, titled "Efficient And Flexible GPS baseband Architecture," filed on May 6, 2005, the specification of which is incorporated in its entirety herein by reference.

The processor 113 receives one millisecond integrated (correlated) I and Q values from the GPS baseband section described above. In order to acquire a GPS signal in the processor 113, all dwells (i.e., pairs of carrier frequency and code phase values) are searched. This is a two-dimensional search. Coherent integration and non-coherent integration are two commonly used integration methods to acquire GPS signals. In coherent integration, the I and Q components are summed separately while in non-coherent integration the values are squared and added. Thus, non-coherent integration involves squaring loss and is therefore less efficient. On the other hand, coherent integration requires a low residual carrier frequency or more frequency bins to search. Thus, for an equal integration time coherent integration provides better signal gain at the cost of larger computational load. Therefore, a combination of coherent and non-coherent integration is used in practice. If the received signal is weak or has a low signal-to-noise ratio, a long combination of coherent and non-coherent integration is required. Thus, the time durations of coherent and non-coherent integrations depend upon the signal-to-noise ratio of the received signal. The lower the signal-to-noise ratio, the longer the integration time.

Each of the satellite in the GPS constellation transmits a navigation data stream also known as Nav (Navigation) data at a rate of 50 bits/second. The navigation data stream consists of information on position of satellite (Ephemeris), health of the satellite, correction for GPS time and ionosphere and troposphere propagation correction parameters and less precise information on other satellite positions (Almanac), all continuously transmitted at 50 bits/second. This data stream may be grouped into sub-frames, frames and super-frames with each sub-frame consisting of 300 bits, each frame containing of five consecutive sub-frames, and each super-frame consisting of 25 frames. Thus, the transmission duration of a sub-frame is 6 seconds and a frame is 30 seconds while a super-frame has a time duration of 12.5 minutes. Each sub-frame consists of 10 words with 30 bits in each word. Each 30 bit word plus the last two bits of the previous word is encoded into an extended Hamming (32,26) block code with 32 symbols and 26 information bits. Here only 24 of the bits are true information bits. The first word in all the sub-frames is the TLM (Telemetry) word. The first eight bits of this TLM word is the preamble represented by 10001011. The other bits of this word are not used. Similarly, the next word of any sub-frame is the HOW (Hand Over Word) word. The first 17 bits also known as the HOW word are the truncated TOW (Time Of Week) of 19 bits. It represents the GPS time of start of the next sub-frame in terms of Z-counts (one Z-count is 1.5 seconds) or it represents the number of the sub-frames from the start of the week. This should increase by one from sub-frame to sub-frame and thus serves as a check for correct synchronization. The next two bits of the second word of any sub-frame are synchronization and momentum flags and are normally not used. The next three bits are the sub-frame ID (possible values 1,2,3,4,5 or 001, 010, 011, 100 and 101). These data will be used for sub-frame matching. The other bits in the second word are related to parity bits with the last two bits at position 29 and 30 are always '0' which is needed to identify the correct polarity of the data bits decoded. The first ten bits of the third word of the first sub-frame provide the week number and is constant over a week. Thus, these ten bits may be used for pattern matching over one week period in addition to the preamble. But unlike the preamble, this pattern repeats only once in 30 seconds.

Operations of a GPS receiver according to an embodiment of the invention will now be described. At power switch on, the GPS receiver is assumed to be in an outdoor environment or in an environment where the signals are strong enough for initial acquisition. Once the receiver has acquired enough number of satellite signals and computed the receiver position, the receiver may be moved indoor. However, this initial acquisition may also be accomplished with very week satellite signals. After being moved indoors, the receiver tracks at least one satellite signal. One of the characteristics of the indoor environment is less dynamics resulting in very small change in Doppler shifts due to receiver motion and a smaller temperature variation with a low SNR. Therefore, the tracking of the at least one satellite signal may be maintained using a long integration. This continuous tracking of the satellite signal provides the needed real time clock for very fast reacquisition of the other GPS satellite signals when the signal is sufficiently strong. To save power, the receiver automatically goes to a power-off (sleep) mode and periodically powers on (wake-up) to maintain the at least one satellite tracking. To save significant power, the sleep period is large compared to the wake-up period. A prior estimation of the acquisition parameters like code phase, carrier frequency offset, ect. is made using the collected Temperature Compensated Crystal Oscillator (TCXO) count and Delay Lock Loop (DLL) compensation during the power on or wake-up period. Further details on the TCXO count and DLL compensation can be found in copending U.S. patent application Ser. No. 11/322,654, titled "Timing Calibration For Fast Signal Reacquisition In Navigational Receivers," filed on the same date as the present application, the specification of which is incorporated in its entirety herein by reference.

Figure 2:
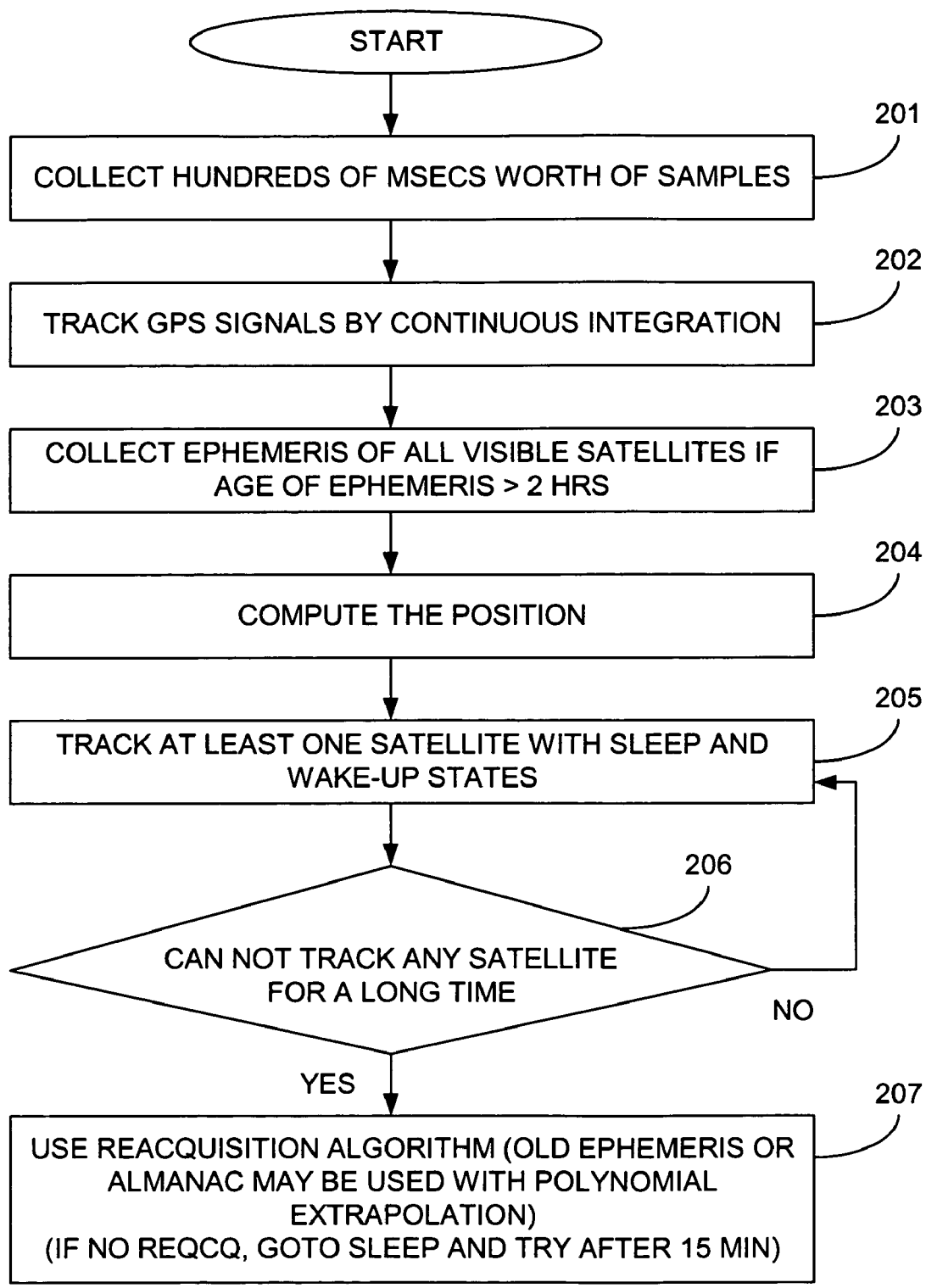
FIG. 2 is a flowchart showing GPS signal acquisition and tracking according to an embodiment of the invention.

FIG. 2 is a flowchart showing steps involved in the acquisition and tracking of a weak GPS signal by a GPS receiver according to an embodiment. In step 201, a large number of correlated 1 ms samples, e.g., 120 millisecond worth of the signal samples, are collected and stored in memory for further processing. These stored samples are used in long coherent integration to acquire the GPS signals in step 202 as explained below.

A long coherent integration of the input signal requires a large number of frequency bins or low residual carrier frequency. If the coherent integration time is Tc seconds, then the carrier frequency should be less than ½ Tc Hz. In addition to this low frequency requirement, it is necessary to remove the navigation data bits in the signal when the integration time is more than 20 milliseconds. If these data bits are not removed, inversion of the samples may occur and integration result is not useful because cancellations in the summation occur. Therefore, it is necessary to remove the embedded data bits. But as explained earlier, most of these data bits are not known a priori except the preamble at the start of each sub-frame. Further, the navigation data bit edges are synchronized with the one millisecond samples, i.e. a data bit edge will be present within a 20 millisecond interval at one of the samples. Of course, this assumes there is a data bit polarity change within this interval because it may be possible to have consecutive data bits of the same polarity in which case the navigation data bit edge cannot be detected. Thus, the preamble start is aligned with each of the successive one millisecond samples as the starting point and the required coherent integration is carried out. The coherent integration results in a large value when the data in the received signal matches with this local preamble at one of the one millisecond samples. A threshold value can be determined by a number of prior trials. Thus whenever the coherent integration exceeds this threshold the alignment of the local replica with the received signal may be assumed. As the week number is usually known, it is also possible to use 10 bits of week number in place of preamble or use both of them. It is also possible to use the HOW word when the time information is available. A separate threshold can be determined when week number or HOW are used. Thus, the known preamble or HOW word or week number of navigation data is assumed in coherent integration over a duration extending over several NAV data bits. As the threshold value can be determined by prior trial or experimentation, the preamble or the HOW word or week number is identified when the computed integration value is higher than a predetermined threshold value. In this scenario, because of interference or noise, it is possible to obtain more than one positions having an integration value greater than the threshold. The actual position may be confirmed by coherent integration after 6 seconds when the preamble or HOW repeats. But the value of HOW will increase by 1. For example, the actual position may be confirmed when an integration and a similar integration after 6 seconds way both exceed the threshold. On the other hand when week number is used, the coherent integration should be repeated after 30 seconds, 30 seconds being the repetition time of week number. The integration may have to be repeated several times in order to confirm a single position. Thus, the preamble or HOW word or week number synchronization is confirmed by integrating several times at regular predetermined time intervals, the predetermined time interval being the repeat time of the patterns.

Thus by using the navigation data preamble or the known HOW word or week number and employing long coherent integration, the GPS signals are acquired in step 202. If the signal can not be acquired, then the receiver may go to the sleep mode and wake up and attempt to acquire the signal after some time delay, e.g., 15 minutes. If the stored ephemeris is older than, e.g., 2 hours, new ephemeris may be collected from the signal in step 203. Unlike almanac only, the ephemeris of the tracked satellite can be collected. But almanac of all satellites may be collected from a single satellite signal. In step 203, the receiver may collect and store ephemeris for each visible satellite. Once a sufficient number of satellite signals are acquired and tracked, the position of the receiver is computed and stored in memory as indicated in step 204. Preferably, the memory is non-volatile Flash memory, which does not require power to retain stored data. The receiver then goes to an at least one satellite tracking mode in step 205. In the at least one satellite tracking mode, the receiver tracks at least one satellite signal and switches between a sleep state and wakeup state to conserve power. The at least one satellite tracking mode is discussed in further detail below with reference to FIG. 3. In step 206, if the receiver cannot track any satellite for a long time after coming out of the sleep state in the at least one satellite tracking mode, the receiver attempts a reacquisition of the signal in step 207 using old ephemeris or almanac data stored in the receiver. In step 207, if the receiver cannot reacquire the signal, the receiver may go to sleep for, e.g., 15 minutes, and try again. In addition to these functions the receiver may look for new satellites emerging from the horizon. This is required in order to switch over to new satellites when the present satellites moves out of sight. For acquisition of new satellite, the receiver uses stored ephemeris. Further, for acquisition of a new satellite, the receiver can use almanac when ephemeris is not available. On the other hand, if the old ephemeris is available, a better ephemeris value may be obtained by extrapolating the available outdated values. Thus, it is possible to obtain a better approximation by predicting the values of the ephemeris when the ephemeris can not be down-loaded or is outdated. Several methods for prediction are possible. Methods based on tables are claimed in the prior art and so here the predicting of the values of the outdated ephemeris using a polynomial extrapolation is employed. The polynomial order depends on the ephemeris parameter. Some of these parameters may change very little while some other may change by a large value.

Figure 3:
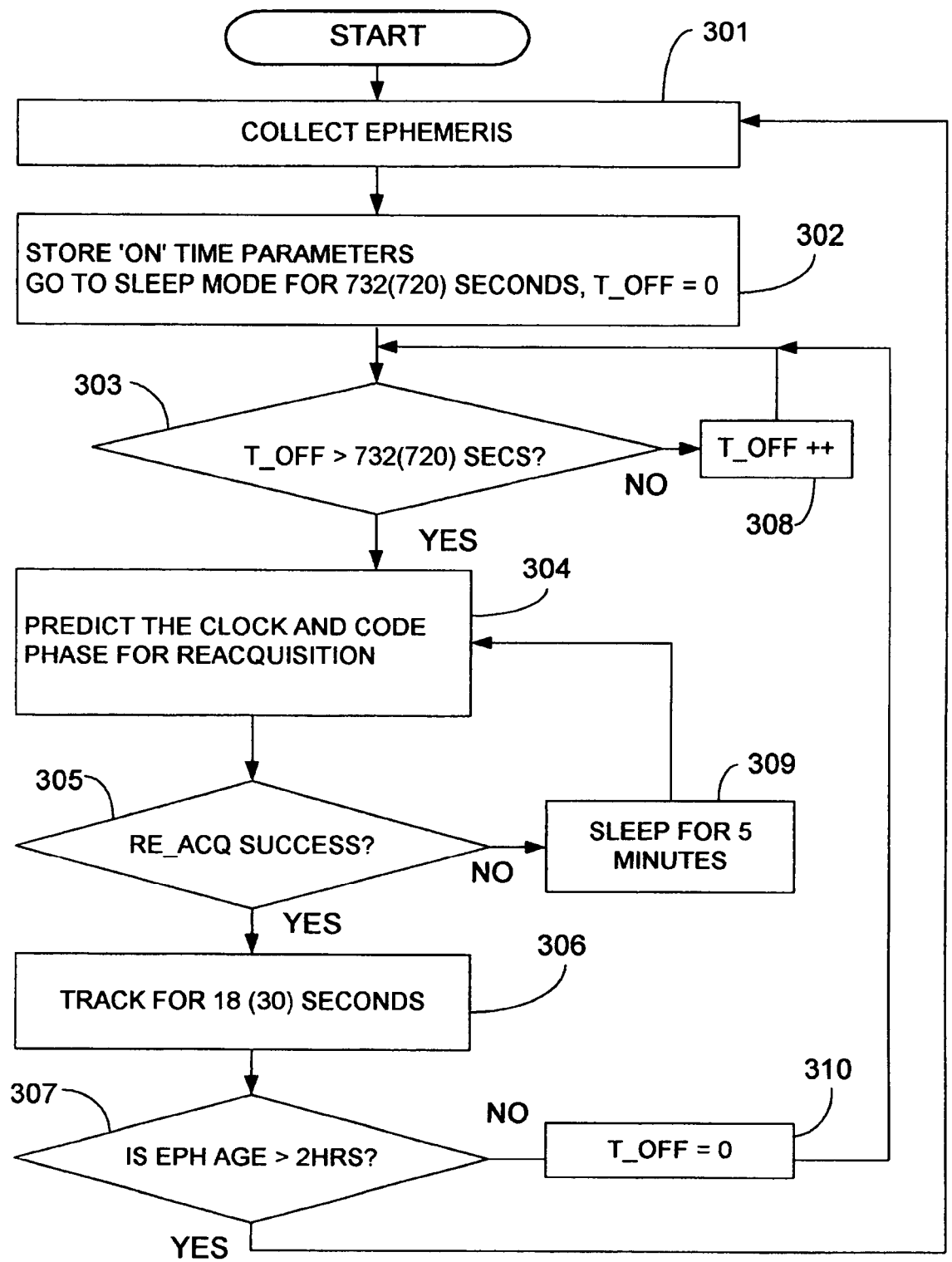
FIG. 3 is a flowchart showing tracking of at least one satellite signal in a power saving mode according to an embodiment of the invention.

The FIG. 3 is a flowchart of the at least one satellite tracking mode for maintaining the GPS clock for quick acquisition or reacquisition. In step 301, the receiver collects the ephemeris for, e.g., 18 (or 30) seconds, and clock calibration parameters that are needed for fast acquisition of the signals are computed and stored in a memory on the receiver. The clock calibration parameters may also be computed later. Details of how to compute the clock calibration parameters and other acquisition parameters are given in copending U.S. patent application Ser. No. 11/322,654, titled "Timing Calibration For Fast Signal Reacquisition In Navigational Receivers," filed on the same date as the present application, the specification of which was previously incorporated by reference.

Briefly, the ephemeris and stored receiver position taken outdoors prior to moving indoors are used to compute the clock calibration parameters and other acquisition parameters for fast acquisition or reacquisition of GPS signals.

In step 302, the receiver goes to the sleep state for, e.g., 732 (or 720) seconds, where 732 (or 720)+18 (or 30) is equal to 750 seconds, which is the time duration of one super-frame (12.5 Minutes) and the time T_OFF is set to 0. T_OFF is incremented in step 308 until it reaches 732 (or 720) seconds. After being in the sleep mode for 732 (or 720) seconds in step 303, the receiver is powered 'ON' and reacquires the satellite signal using the stored parameters to predict the acquisition parameters, i.e. clock and code phase, in step 304. If the reacquisition is not successful after, e.g., 5 seconds, the receiver again goes to sleep state for 5 minutes or more in step 309 and again attempts to reacquire the signal. This process continues until the acquisition is successful. Once the receiver acquires the signal, it tracks the satellite signal for 18 seconds (or 30 seconds) in step 306. Meanwhile, in step 307, if the stored ephemeris is old the receiver may download the particular satellite ephemeris if new ephemeris are available. Otherwise the receiver again stores the reacquisition parameters and goes to the sleep state for 732 (or 720) seconds in step 303. The timer T_OFF is set appropriately as in step 310 or incremented as in step 308.

Once the signal has been acquired, it is necessary to extract the embedded ephemeris data. Since the SNR (Signal-to-Noise ratio) may be very low, it may not be possible to determine the exact data polarity of all of the data bits. There may be a small probability of bit error, which may be less than 0.001. In such cases, the result of addition of the respective bits of the navigation data frames gives better estimation of the actual bit value. This addition may be carried out in both the I and Q branches of integration. So several navigation data frames, each consisting of five sub-frames with a frame duration of 30 seconds are collected. As the probability of the same bit in different frames being in error is extremely low, the signal-to-noise ratio is improved by an overlay of several sequential navigation data frames in both the In-phase and Quadrature paths in the receiver. It is also possible to separately examine each bit over several frames and arrive at a decision. Thus, the signal-to-noise ratio may be improved by a majority voting decision based on a majority vote of several sequential navigation data frames for each bit. The probability of bit error increases with a decrease in the signal-to-noise ratio and so a greater number of frames are required to arrive at a correct decision. Therefore, the number of navigation data frames used depends on the signal-to-noise ratio. When the overlapping of several frames is done to extract the data bits, it is necessary to align the frames correctly. Since the preamble in a sub-frame is known, the preamble can be used for correct overlap of the frames. It is possible that a bit in the preamble may be in error and to handle such cases any predetermined or known navigation data words can be used for correct overlap of frames. This additional patterns or words include the week number or HOW among other predetermined words.

The time duration during which the receiver can stay in wake-up or sleep state depends on how well the clock information is maintained. The better the timing information accuracy, the power off time can be longer and the associated power dissipation may be reduced. Further, the reacquisition may also be faster with accurate parameters. To maintain a good timing information, a time matching and compensation scheme is implemented.

During tracking, an appropriate frequency domain technique, e.g., a long Fast Fourier Transform (FFT), may be used to determine the carrier frequency when there is a wide frequency variation due to high dynamics. Thus, a long FFT is computed and the peak determines the carrier frequency. Because of the resulting large number of frequency components, a high dynamic signal can be easily tracked. The long FFT results in better precision frequency components. However, samples for the long FFT computation may have to be collected for a long period of time. To reduce the time of the FFT computation, the frequency domain technique can be sliding window based. This technique uses the old samples which were used in the prior FFT computation with the new samples collected later. For example, this technique may use 128 old samples with 128 new samples so that the FFT is computed every 128 milliseconds instead of every 256 milliseconds. The sliding ratio or the ratio of the new samples to the old samples depends upon the receiver dynamics. In the computation of the FFT, each sample is compensated for the phase shift of succeeding samples due to ever changing Doppler.

In the preferred embodiment, integration, data bit extraction and the FFT are performed by the processor 113. Preferably, the processor 113 is implemented on a DSP core capable of performing fast math intensive operations as is known in the art.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A method for operating a satellite-based navigational receiver under weak signal conditions, comprising:
   switching the receiver between a sleep state with a portion of the satellite-based navigation receiver powered down and a wake-up state where the receiver has access to first ephemeris data;
   predicting first position information for an at least one satellite using polynomial extrapolation based upon at least the first ephemeris data;
   acquiring at least one satellite signal during the wake-up state using at least the predicted first position information, if the receiver is unable to acquire the at least one satellite signal during the wake up state, switching the receiver to the sleep state and reattempting to reacquire the at least one satellite signal after a predetermined period using at least the predicted first position information; and
   attempting to collect second ephemeris data from the at least one satellite signal acquired during the wake-up state.

2. The method of claim 1, further comprising using the first ephemeris data from the at least one satellite signal to synchronize a receiver clock with GPS time.

3. The method of claim 1, wherein the long integration comprises long coherent integration.

4. The method of claim 1, wherein the long integration comprises long non-coherent integration.

5. The method of claim 1, wherein time durations of the long integration depend on signal-to-noise ratios of the satellite signals.

6. The method of claim 1, wherein a period of the sleep state is in the range of (720 to 730 seconds)*n, where n is an integer and a period of the wakeup state is in the range of 18 to 30 seconds.

7. The method of claim 1, further comprising switching to a new satellite signal when the receiver can no longer track the at least one satellite signal.

8. The method of claim 1, wherein extracting the first ephemeris data further comprises extracting the first ephemeris data by overlaying a plurality of sequential data frames in the at least one satellite signal.

9. The method of claim 8, wherein the receiver has in-phase and Quadrature paths, and the sequential navigation frames are overlaid in both the in-phase and Quadrature paths.

10. The method of claim 8, further comprising using preambles in the data frames to correctly overlay the plurality of sequential data frames.

11. The method of claim 8, further comprising using predetermined words in the data frames to correctly overlay the plurality of sequential data frames.

12. The method of claim 8, wherein the number of data frames depends on the signal-to-noise ratio of the at least one satellite signal.

13. The method of claim 1, wherein extracting the first ephemeris data further comprises extracting the ephemeris data based on a majority voting decision of a plurality of sequential data frames in the at least one satellite signal.

14. The method of claim 1, further comprising using almanac data when the first ephemeris data is unavailable.

15. The method of claim 1, wherein the tracking of the at least one satellite signal occurs when the receiver is operating indoors.

16. The method of claim 1, wherein acquiring the satellite signals using the long integration further comprises:
   extending the long integration over a duration of several navigation data bits; and
   assuming at least one of a preamble, a hand-over word (HOW), and a week number to facilitate acquisition of the satellite signals.

17. The method of claim 16, further comprising:
   establishing a threshold value for the long integration; and
   identifying the at least one of the preamble, the HOW word, and the week number when the long integration has a value greater than the threshold value.

18. The method of claim 16, further comprising synchronizing the long integration to the at least one of the preamble, the HOW word, and the week number by integrating several times at predetermined time intervals, the predetermined time intervals being a repeat time of the at least one of the preamble, the HOW word, and the week number.

19. The method of claim 1, further comprising using a frequency domain technique to handle wide frequency variations due to high dynamics.

20. The method of claim 19, wherein the frequency domain technique comprises computing a Fast Fourier Transform.

21. The method of claim 20, wherein the Fast Fourier Transform computation is based on a sliding window.

22. The method of claim 1, further comprising predicting the ephemeris data when the ephemeris data is unavailable.

23. The method of claim 1, wherein the long integration is long coherent integration and navigation data is used to facilitate the long coherent integration.

24. The method of claim 1, wherein the satellite signals are transmitted from GPS satellites.

25. The method of claim 1, wherein the satellite signals are transmitted from a GLONASS or Galileo navigational system.

26. A navigational receiver, comprising:
   a radio frequency front-end for receiving satellite signals;
   a baseband section for processing the received satellite signals into correlated values; and a processor adapted to:
switch the receiver between a sleep state with a portion of the satellite-based navigation receiver powered down and a wakeup state, where the receiver has access to first ephemeris data;
predict first position information for an at least one satellite using polynomial extrapolation based upon at least the first ephemeris data;
acquire at least one satellite signal during the wake-up state using at least the predicted first position information, if the processor is unable to acquire the at least one satellite signal during the wake up state, switch the radio frequency front-end to the sleep state and reattempt to reacquire the at least one satellite signal after a predetermined period using at least the predicted first position information;
attempt to collect second ephemeris data from the at least one satellite signal during the wake-up state.

27. The navigational receiver of claim 26, wherein the processor computes receiver position indoors and stores the receiver position in memory.

28. The navigational receiver of claim 27, wherein the processor computes acquisition parameters from the collected first ephemeris data and stored receiver position.

29. The navigational receiver of claim 26, wherein the processor performs long coherent integration on the correlated values.

30. The navigational receiver of claim 28, wherein time durations of the long integration depend on signal-to-noise ratios of the satellite signals.

31. The navigational receiver of claim 26, wherein a period of the sleep state is in the range of (720 to 730 seconds)*n, where n is an integer and a period of the wakeup state is in the range of 18 to 30 seconds.

32. The navigational receiver of claim 26, wherein the processor switches to a new satellite signal when the receiver can no longer track the at least one satellite signal.

33. The navigational receiver of claim 26, wherein the processor extracts the first ephemeris data by overlaying a plurality of sequential data frames in the at least one satellite signal.

34. The navigational receiver of claim 33, wherein the baseband section has in-phase and Quadrature paths, and the processor overlays the sequential navigation frames both the in-phase and Quadrature paths.

35. The navigational receiver of claim 33, wherein the processor uses preambles in the data frames to correctly overlay the plurality of sequential data frames.

36. The navigational receiver of claim 33, wherein the processor uses predetermined words in the data frames to correctly overlay the plurality of sequential data frames.

37. The navigational receiver of claim 33, wherein the number of data frames depends on the signal-to-noise ratio of the at least one satellite signal.

38. The navigational receiver of claim 26, wherein the processor extracts the first ephemeris data based on a majority voting decision of a plurality of sequential data frames in the at least one satellite signal.

39. The navigational receiver of claim 26, wherein the processor uses almanac data when the first ephemeris data is unavailable.

40. The navigational receiver of claim 26, wherein the processor tracks the at least one satellite signal when the receiver is operating indoors.

41. The navigational receiver of claim 26, wherein, in being adapted to integrate the correlated values to acquire the satellite signals, the processor is further adapted to:
integrate the correlated values over a duration of several navigation data bits; and
assume at least one of a preamble, a hand-over word (HOW), and a week number to facilitate acquisition of the satellite signals.

42. The navigational receiver of claim 41, wherein the processor is further adapted to:
establish a threshold value for the integration of the correlated values; and
identify that at least one of the preamble, the HOW word, and the week number when the integration of the correlated values has a value greater than the threshold value.

43. The navigational receiver of claim 41, wherein the processor synchronizes the integration of the correlated values to the at least one of the preamble, the HOW word, and the week number by integrating several times at predetermined time intervals, the predetermined time intervals being a repeat time of the at least one of the preamble, the HOW word, and the week number.

44. The navigational receiver of claim 26, wherein the processor uses a frequency domain technique to handle wide frequency variations due to high dynamics.

45. The navigational receiver of claim 44, wherein the frequency domain technique comprises computing a Fast Fourier Transform.

46. The navigational receiver of claim 45, wherein the Fast Fourier Transform computation is based on a sliding window.

47. The navigational receiver of claim 26, wherein the satellite signals are transmitted from GPS satellites.

48. The navigational receiver of claim 26, wherein the satellite signals are transmitted from a GLONASS or Galileo navigational system.

* * * * *